United States Patent [19]

Seguchi et al.

[11] Patent Number: 5,985,949
[45] Date of Patent: Nov. 16, 1999

[54] PRODUCT HAVING REDUCED FRICTION AND IMPROVED ABRASION RESISTANCE

[75] Inventors: Tadao Seguchi; Noboru Kasai, both of Gunma; Akinari Nakayama; Hideki Yagyu, both of Ibaraki; Yoneho Tabata; Kazushige Otsuhata, both of Tokyo; Shigetoshi Ikeda, Gunma; Akihiro Ohshima, Tochigi; Mitsuharu Morozumi; Masumi Nomura, both of Kanagawa, all of Japan

[73] Assignees: Japan Atomic Energy Research Institute; Hitachi Cable, Ltd.; Raytech Corporation; Asahi Glass Co., Ltd., all of Tokyo, Japan

[21] Appl. No.: 08/838,812

[22] Filed: Apr. 10, 1997

[30] Foreign Application Priority Data

Apr. 11, 1996 [JP] Japan .................................. 8-089767

[51] Int. Cl.$^6$ ................ C08F 2/46; C08F 2/54; C08F 2/48; C08J 3/28
[52] U.S. Cl. ................................ 522/5; 522/156
[58] Field of Search ................ 522/156, 5, 911, 522/912

[56] References Cited

U.S. PATENT DOCUMENTS

Re. 28,628  11/1975  Carlson et al. ...................... 522/112
3,766,031  10/1973  Dillon .
4,666,642   5/1987  Glaister ...................................... 264/27
5,444,103   8/1995  Tabata et al. .

FOREIGN PATENT DOCUMENTS 6-116423  4/1994  Japan .
7-118423  5/1995  Japan .
7-118424  5/1995  Japan .

OTHER PUBLICATIONS

Derwent Publications Japanese Patent Abstract 7126468 May 16, 1995.
Derwent Publications Japanese Patent Abstract 63041538 Feb. 22, 1988.
Derwent Publications Japanese Patent Abstract 07118423 May 9, 1995.

*Primary Examiner*—Nathan M. Nutter
*Attorney, Agent, or Firm*—McDermott, Will & Emery

[57] ABSTRACT

A product having reduced friction and improved abrasion resistance comprises a formed resin containing at least one fluorine-containing polymer which is exposed to an ionizing radiation. The formed resin may include from 1 to 100 weight percent of the fluorine-containing polymer in the form of powder, and from 99 to 0 percent of a high molecule polymer which is not exposed to the ionizing radiation. The fluorine-containing polymer is preferably exposed to the ionizing radiation for a total dose of from 1 KGy to 10 MGy in the absence of oxygen at a temperature not lower than the melting point of a starting fluorine-containing polymer.

17 Claims, No Drawings

PRODUCT HAVING REDUCED FRICTION AND IMPROVED ABRASION RESISTANCE

FIELD OF THE INVENTION

This invention relates to a product having reduced friction, and improved abrasion resistance. Specifically, this invention relates to a fluorine-containing resin product having reduced friction and improved abrasion resistance. The inventive product has utility as a nonlubricated bearing and a dynamic seal.

BACKGROUND OF THE INVENTION

A fluorine-containing polymer or resin is a material having improved resistance to chemicals and heat. It has been used extensively as both an industrial and a consumer resin. The conventional fluorine-containing polymer, however, may not be used in an environment of frictional motion due to abrasion or creep deformation of the material. To overcome these shortcomings, a certain filler has been added to the conventional fluorine-containing polymer. Such filler, however, impairs preferable inherent characteristics of the fluorine-containing resin. As a result, it has had limited uses according to circumstances and has not always been satisfactory.

SUMMARY OF THE INVENTION

Accordingly, it is an object of the invention to provide a product having reduced friction and improved abrasion resistance and which maintains its inherent preferable characteristics It is a further object of the invention to provide a product having reduced friction, improved abrasion resistance, and improved load resistance.

According to the first feature of the invention, a product having reduced friction and improved abrasion resistance comprises a formed resin containing at least one ionizing radiation irradiated fluorine-containing polymer. The formed resin may include from 1 to 100 weight percent of the fluorine-containing polymer in the form of powder, and from 99 to 0 percent of a high molecule polymer which is not exposed to the ionizing radiation. The formed resin may be produced by molding a mix of powder by press, wherein the mix consists essentially of from 1 to 100 weight percent of the fluorine-containing polymer in the form of powder, and from 99 to 0 percent of a high molecule polymer which is not exposed to the ionizing radiation. The fluorine-containing polymer is preferably exposed to the ionizing radiation for a total dose of from 1 KGy to 10 MGy in the absence of oxygen, and more preferably it may be exposed to the ionizing radiation at a temperature not lower than the melting point of a starting fluorine-containing polymer.

According to the second feature of the invention, a product having reduced friction and improved abrasion resistance comprises a formed resin containing from 1 to 100 percent of an ionizing radiation irradiated fluorine-containing polymer in the form of powder, wherein each particle of the ionizing radiation irradiated fluorine-containing polymer powder has a diameter of less than 1 mm, and wherein the ionizing radiation irradiated fluorine-containing polymer powder is such that a coefficient of abrasion of the formed resin which contains less than 99 weight percent of high-molecule polymer and more than 1 weight percent of the ionizing radiation irradiated fluorine-containing polymer powder is less than a half of that of a formed resin which contains only high-molecule polymer. The ionizing radiation irradiated fluorine-containing polymer powder is preferably fluorine-containing polymer powder which is exposed to an ionizing radiation for a total dose of from 1 KGy to 10 MGy in the absence of oxygen.

More preferably, the ionizing radiation irradiated fluorine-containing polymer powder is a fluorine-containing polymer powder which is exposed to an ionizing, radiation in the absence of oxygen at a temperature not lower than the melting point of a starting fluorine-containing polymer.

According to the third feature of the invention, a product having reduced friction and improved abrasion resistance comprises a formed resin containing an ionizing radiation irradiated fluorine-containing polymer, the peaked crystal melting point thereof being lower than 325° C., an amount of heat of crystallization thereof being less than 40 J/g, and a coefficient of abrasion thereof being less than a half of that of a formed resin which contains non-radiated fluorine-containing polymer. The ionizing radiation irradiated fluorine-containing polymer is preferably a fluorine-containing polymer which is exposed to an ionizing radiation in the absence of oxygen at a temperature not lower than the melting point of a starting fluorine-containing polymer. More preferably, the formed resin is produced by molding ionizing radiation irradiated fluorine-containing polymer powder by press, the ionizing radiation irradiated fluorine-containing polymer powder being powder which is exposed to an ionizing radiation in the absence of oxygen at a temperature not lower than the melting point of a starting fluorine-containing polymer.

DESCRIPTION OF THE PREFERRED EMBODIMENTS

The product having reduced friction and improved abrasion resistance in accordance with the invention is characterized by a formed resin which includes an ionizing radiation irradiated fluorine-containing polymer. The ionizing radiation irradiated fluorine-containing polymer is a fluorine-containing polymer which is exposed to an ionizing radiation. A process for producing a ionizing radiation irradiated polytetrafluoroethylene polymer (hereinafter referred to as PTFE) which is improved in reduction in the radiation-induced deterioration of breaking extension and breaking strength by exposing a starting PTFE to an ionizing radiation in specific conditions has been proposed in Japanese Published Patent Applications No. 6-116423 (corresponding U.S. Pat. No. 5,444,103), No. 7-118423 and No. 7-118424.

The fluorine-containing polymer to be used in the invention may include PTFE, tetrafluoroethylene-perfluoro (alkylvinylether) copolymer (hereinafter referred to as PFA), tetrafluoroethylene-hexaflouropropylene copolymer (hereinafter referred to as FEP) and the like. The PTFE may included a less than 0.2 molar percent of monomers which can be copolymerized, such as perfluoro(alkylvinylether), hexafluoropropylene, perfluoro(alkylethylene), and chlorotrifluoroethylene. If the fluorine-containing polymer comprises the aforementioned copolymers, a small amount of other elements may be included in their molecular structures.

According to the invention, the product may be made of not only a single compound of the fluorine-containing polymer but also a mix of two or more compounds thereof.

Furthermore, a high-molecule polymer other than the fluorine-containing polymer, especially a high-molecule polymer having heat resistance characteristics may be mixed into the single compound of the fluorine-containing polymer, or the mix of two or more compounds thereof. In this case, the ionizing radiation may be exposed to not only a resulting mix thereof, but also just the fluorine-containing polymer, which is afterward mixed with the high-molecule polymer. The high-molecule polymer is preferably a polymer having a heat resistance of more than 300° C. in the absence of oxygen. Such a high-molecule polymer includes fluorine-containing copolymers such as ethylene-tetraflouroethylene copolymer, ethylene-chlorotrifluoroethylene copolymer, propylene-tetrafluoroethylene copolymer, and vinylidenefluoride-hexafluoropropylen-tetrafluoroethylene copolymer. Examples of other high-molecule polymers include polyamide, aromatic polyamide, polyarylenesulfide, and aromatic polyester.

For producing the product of the invention, a process which comprises the steps of performing a fluorine-containing polymer in a predetermined shape, then firing the perform, and then exposing the perform to an ionizing radiation is generally used. According to the circumstances, the product may be produced by other processes comprising different step(s), such as (a) molding fluorine-containing polymer powder which is preliminary exposed to an ionizing radiation by press, (b) molding a mix of fluorine-containing polymer powder which is preliminary exposed to an ionizing radiation and non-irradiated powder of other polymer by press, (c) performing a mix of fluorine-containing polymer powder and high-molecule polymer having heat resistance characteristics into a predetermined shape by press, and (d) forming a fluorine-containing polymer sheet, exposing the sheet to an ionizing radiation, then punching the sheet into a predetermined shape.

In the invention, the ionizing radiation to be radiated may includes γ-ray, electron beams, X-ray, neutron beams and high-energy ions. The exposure to the ionizing radiation is preferably carried out in the absence of oxygen, and a total dose of exposure is preferably in the range of between 1 KGy and 10 MGy. Moreover, in view of reducing friction, and improving abrasion resistance and load resistance characteristics, the more preferable total dose of exposure is in the range of between 10 KGy and 1500 KGy.

When exposing the fluorine-containing polymer to an ionizing radiation, the polymer is preferably heated at no lower than the melting point of the starting fluorine-containing polymer. For example, to obtain an ionizing radiation irradiated PTFE, the starting PTFE is preferably exposed to the ionizing radiation at the temperature which is higher than its crystal melting point of 327° C. If PFA or FEP is used as a starting fluorine-containing polymer, they are preferably exposed to the ionizing radiation at temperatures which are higher than their melting points of 327° C., and 275° C., respectively.

Heating the starting fluorine-containing polymer at not lower than its crystal melting point activates movements of molecules in main chains of the fluorine-containing resin, which results in facilitating cross-link reactions between molecules. Excessive heating may cause disconnections of chains between molecules, thereby causing decomposition. Therefore, the heating temperature ought to be between 10 degrees and 30 degrees higher than the crystal melting point of the starting fluorine-containing resin to control the generation of disconnections of chains between molecules.

The product having reduced friction and improve abrasion resistance in accordance with the invention is suitable for various uses, such as nonlubricated bearing and a dynamic seal, rolls for copy machines, and a bearing pad, for which the conventional fluorine-containing polymer product has been unsuitable.

The following examples ar provided for the purpose of further illustrating the invention but are in no way to be taken as limiting.

EXAMPLE

Examples 1~6

Commercial PTFE sheets having 0.5 mm thickness were exposed to electron beams for various total doses in vacuum of less than 0.01 Torr (i.e. in the absence of oxygen) at an elevated temperature of 340° C. to obtain sheet products of the invention. The total doses were 50 KGy (EXAMPLE 1), 100 KGy (EXAMPLE 2), 300 KGy (EXAMPLE 3), 500 KGy (EXAMPLE 4), 1000 KGy (EXAMPLE 5), and 1500 KGy (EXAMPLE 6), respectively. The EXAMPLES 1~6 and the commercial PTFE sheet which was not exposed to any ionizing radiation (COMPARISON 1) were subject to friction and abrasion measuring tests, results of which are shown in TABLE 1.

A thrust type friction and abrasion testing machine was used for the tests, wherein each sample of these sheets was pressed by a cylindrical ring (an outer diameter and an inner diameter of which are 25.6 mm and 20.6 mm, respectively) at 2.5 kg/cm$^2$ and moved at 0.5 m/sec for 2 hours. The PV value (calculated by multiplying pressure by velocity) was 1.25 kg·m/cm$^2$·sec. After completion of the tests each sample was subject to measuring the amount of decreased weight. The decreased weight of each sample was converted into decreased volume, which was divided by contact area of the cylindrical ring to calculate abrasion depth.

The resulting coefficients of abrasion K (m·sec/MPa/m/hr×10$^{-6}$) were calculated by the definition: W=KPVT, where W is abrasion depth (m), P is load (MPa), V is velocity (m/sec), and T is time (hr).

TABLE 1

|  | COEFFICIENT OF FRICTION | COEFFICIENT OF ABRASION |
| --- | --- | --- |
| EXAMPLE 1 | 0.32 | 0.9 |
| EXAMPLE 2 | 0.28 | 0.03 |
| EXAMPLE 3 | 0.32 | 0.1 |
| EXAMPLE 4 | 0.34 | 0.1 |
| EXAMPLE 5 | 0.42 | 0.2 |
| EXAMPLE 6 | 0.39 | 0.2 |
| COMPARISON 1 | 0.28 | ABNORMAL ABRASION |

Example 7~10

Commercial PFA films having 50 μm thickness (AFLON P-63P, made by ASAHI GLASS CO., LTD.) were adhesively attached to a SUS304 plate and exposed to electron beams at various temperatures for various total doses in vacuum of less than 0.01 Torr (i.e. in the absence of oxygen) to obtain film products of the invention. The temperatures and total doses were 315° C., 100 KGy (EXAMPLE 7); 315° C., 1000 KGy (EXAMPLE 8); 315° C., 500 KGy (EXAMPLE 9); and 310° C., 100 KGy (EXAMPLE 10), respectively. The EXAMPLES 7~10 and the commercial PFA film which was not exposed to any ionizing radiation (COMPARISON 2) were subject to friction and abrasion measuring tests, results of which are shown in TABLE 2.

The same thrust-type friction and abrasion testing machine was used for the measurement of coefficients of abrasion of EXAMPLES 7 and 8 in the same manner as for EXAMPLES 1~6 in TABLE 1, while a pin-on-disk type friction and abrasion testing machine was used for the measurement of abrasion characteristics of EXAMPLES 9 and 10. The abrasion characteristics was defined by abrasion depths which were measured in the condition that the diameter of a ball was ¼ inch (6.350 mm), the load was 0.2 kg. the peripheral speed was 5 m/min for 10 hours. For COMPARISON 2, a coefficient of friction and an abrasion depth were measured by the same thrust type friction and abrasion testing machine and pin-on-disk type friction and abrasion testing machine, respectively.

TABLE 2

|  | COEFFICIENT OF FRICTION | ABRASION DEPTH ($\mu$m) |
|---|---|---|
| EXAMPLE 7 | 0.09 | — |
| EXAMPLE 8 | 0.09 | — |
| EXAMPLE 9 | — | 11 |
| EXAMPLE 10 | — | 10 |
| COMPARISON 2 | 0.20 | 31 |

Example 11

PTFE molding powder (TEFLON 70J, made by DU PONT-MITSUI FLUORO-CHEMICALS CO., LTD), which consists essentially of tetrafluoroethylene and perfluoro (alkylvinylether), wherein the molar ratio of former monomer to latter monomer is 99.9:0.1 and average particle diameter of the powder is 50 $\mu$m, was preliminarily molded and fired to produce a cylindrical block having 100 mm diameter and 100 mm height. Then, a sheet of sample having 0.5 mm thickness was sliced off from the block and exposed to electron beams in vacuum of less than 0.01 Torr (i.e. in the absence of oxygen) at an elevated temperature of 340° C. for a total dose of 100 KGy to obtain a sheet product of the invention.

Example 12

PTFE molding powder (FLUON G190, made by ASAHI GLASS CO., LTD.), an average particle diameter of which is 40 $\mu$m, was exposed to electron beams in vacuum of less than 0.01 Torr (i.e. in the absence of oxygen at an elevated temperature of 350° C. for a total dose of 100 KGy. After that, the powder was pulverized into finer powder of an average particle diameter of about 20 $\mu$m by a jet mill, then heat-treated at 300° C. for 12 hours to evaporate high-volatile matters (of about 0.1%).

A mix of 10 weight percent of the irradiated finer powder and 90 weight percent non-irradiated PTFE molding powder was prepared, then preliminarily molded and fired to obtain a sheet product of the invention.

TABLE 3 shows results of coefficient of friction and coefficient of abrasion measuring tests for EXAMPLES 11 and 12. The TABLE 3 also shows a result of coefficient of abrasion test for a sample (COMPARISON 3) which was sliced off from the block of EXAMPLE 11 and not exposed to electron beams. The same thrust type friction and abrasion testing machine was used for the tests as used for EXAMPLES 1~6 in TABLE 1.

TABLE 3

|  | COEFFICIENT OF FRICTION | COEFFICIENT OF ABRASION |
|---|---|---|
| EXAMPLE 11 | — | 4.9 |
| EXAMPLE 12 | 0.24 | 3.4 |
| COMPARISON 3 | — | ABNORMAL ABRASION |

Example 13

PTFE molding powder (G-163, made by ASAHI GLASS CO., LTD.), wherein an average particle diameter of the powder is 40 $\mu$m and a specific weight is 2.16, is exposed to electron beams in vacuum of less than 0.01 Torr (i.e. in the absence of oxygen) at an elevated temperature of 350° C. for a total dose of 100 KGy. After that, the powder was pulverized into finer powder of an average particle diameter of about 20 $\mu$m by a jet mill, then heat-treated at 300° C. for 12 hours to evaporate high-volatile matters (of about 0.1%).

The irradiated PTFE powder was filled into a metallic die and preliminarily molded by press at 200~700 kg/cm$^2$, then placed in an electric furnace and fired at the temperature of 350~400° C. to obtain a block product of the invention of 50 mm (length)×50 mm (width)×10 mm (thickness). The specific weight of the resulting block product was 2.18.

Example 14

Fifty weight percent of electron beam irradiated PTFE powder which was produced by the similar process to that for EXAMPLE 13, and 50 weight percent of non-irradiated PTFE powder which was the same as the starting PTFE powder of EXAMPLE 13 were mixed by a mixer. Then, the mix was filled into a metallic die and preliminarily molded by press at 200~700 kg/cm$^2$, then placed in an electric furnace and fired at the temperature of 350~400° C. to obtain a block product of 50 mm (length)×50 mm (width)×10 mm (thickness). The specific weight of the resulting block was 2.17.

Comparison 4

Non-irradiated PTFE powder (the same as the starting PTFE powder of EXAMPLE 13) was filled into a metallic die and preliminarily molded by press at 200~700 kg/cm$^2$, then placed in an electric furnace and fired at the temperature of 350~400° C. to obtain a block product of 50 mm (length)×50 mm (width)×10 mm (thickness) for comparison.

TABLE 4 shows results of coefficient of friction and coefficient of abrasion measuring tests for EXAMPLES 13 and 14.,and COMPARISON 4. The same thrust-type friction and abrasion testing machine was used for the tests as used for EXAMPLES 1~6 in TABLE 1.

TABLE 4

|  | COEFFICIENT OF FRICTION | COEFFICIENT OF ABRASION |
|---|---|---|
| EXAMPLE 13 | 0.29 | 0.20 |
| EXAMPLE 14 | 0.36 | 0.15 |
| COMPARISON 4 | 0.28 | 65 |

Example 15, 16

PTFE molding powder (G-163, made by ASAHI GLASS CO., LTD.), wherein an average particle diameter of the powder is 40 μm and a specific weight is 2.16, is exposed to electron beams in vacuum of less than 0.01 Torr (i.e. in the absence of oxygen) at an elevated temperature of 350° C. for two different total doses, which were 50 KGy (EXAMPLE 15) and 100 KGy (EXAMPLE 16). After that, each powder was pulverized into finer powder of an average particle diameter of 20 μm by a jet mill, then heat-treated at 300° C. for 12 hours to evaporate high-volatile matters (of 0.1%).

Each irradiated PTFE powder was filled into a metallic die and preliminarily molded by press at 200~700 kg/cm$^2$, then placed in a electric furnace and fired at the temperature of 350~400° C. to obtain block products of the invention of 50 mm (length)×50 mm (width)×10 mm (thickness). The specific weight of the resulting block products was 2.1~2.3.

For EXAMPLE 15 and 16, in addition to testing of coefficient of abrasion by the same thrust type friction and abrasion testing machine as used in EXAMPLE 1~6 in TABLE 1, about 10 mg of sample was removed from each block, and packed in an exclusive pan to measure melting point and amount of heat of crystallization. For the measuring, a differential scanning calorimetry (DSC7, made by PERKIN-ELMER) was used. The results are shown in TABLE 5.

TABLE 5

|  | MELTING POINT (° C.) | AMOUNT OF HEAT OF CRYSTAL- LIZATION (J/g) | COEFFICIENT OF ABRASION |
| --- | --- | --- | --- |
| EXAMPLE 15 | 323.8 | 34.2 | 1.6 |
| EXAMPLE 16 | 321.0 | 34.3 | 0.2 |

As is apparent from the foregoing results by comparing EXAMPLES with COMPARISONS, the products in accordance with the invention indicate lower coefficients of friction, which proves good lubrication characteristics of the products, and improved abrasion resistance, while each COMPARISON shows abnormal abrasion or substantial abrasion depth. Because of these advantages, the product in accordance with the invention proves very useful for more extensive uses in an environment of frictional motion.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A product having reduced friction and improved abrasion resistance, comprising: a resin containing at least one ionizing radiation irradiated fluorine-containing polymer.

2. A product, according to claim 1, wherein:

said resin is a mold of ionizing radiation irradiated fluorine-containing polymer.

3. A product, according to claim 2, wherein:

said resin is produced by exposure to ionizing radiation after molding of fluorine-containing polymer.

4. A product, according to claim 3, wherein:

said resin is exposed to said ionizing radiation for a total dose of from 1 KGy to 10 MGy in the absence of oxygen.

5. A product, according to claim 3, wherein:

said resin is exposed to said ionizing radiation at a temperature not lower than the melting point of a starting fluorine-containing polymer.

6. A product, according to claim 1, wherein:

said resin includes from 1 to 100 weight percent of said fluorine-containing polymer which is exposed to an ionizing radiation, and from 99 to 0 percent of a polymer which is not exposed to said ionizing radiation.

7. A product, according to claim 6, wherein:

said fluorine-containing polymer powder has an average particle diameter of less than 1 mm.

8. A product, according to claim 6, wherein:

said resin is produced by molding a mix of powder by press, said mix consisting essentially of from 1 to 100 percent weight percent of said ionizing radiation irradiated fluorine-containing from 99 to 0 percent of a polymer which is not exposed to said ionizing radiation.

9. A product, according to claim 7, wherein:

said ionizing radiation irradiated fluorine-containing polymer powder is produced by exposure to an ionizing radiation for a total dose of from 1 KGy to 10 MGy in the absence of oxygen.

10. A product, according to claim 5, wherein:

said ionizing radiation irradiated fluorine-containing polymer powder is produced by exposure to an ionizing radiation in the absence of oxygen at a temperature not lower than the melting point of a starting fluorine-containing polymer.

11. A product, according to claim 1, wherein:

said fluorine-containing polymer is selected from the group consisting of the tetrafluoroethylene polymer, tetrafluoroethylene-perfluoro(alkylvinylether) copolymer and tetrafluoroethylene-hexafluoropropylene copolymer.

12. A product having reduced friction and improved abrasion resistance, comprising: a resin containing an ionizing radiation irradiated fluorine-containing polymer, the melting point thereof being lower than 325° C., an amount of heat of crystallization thereof being less than 40 J/g, and a coefficient of abrasion thereof being less than a half of that of a resin which contains non-radiated fluorine-containing polymer.

13. A product, according to claim 10, wherein:

said resin is produced by molding fluorine-containing polymer and subsequently being exposed to an ionizing radiation in the absence of oxygen at a temperature not lower than the melting point of a starting fluorine-containing polymer.

14. A product, according to claim 12, wherein:

said resin is produced by molding ionizing radiation irradiated fluorine-containing polymer powder by press, said ionizing radiation irradiated fluorine-containing polymer powder being powder which is exposed to an ionizing radiation in the absence of oxygen at a temperature not lower than the melting point of a starting fluorine-containing polymer.

15. An abrasior resistant product, comprising:

a resin containing an ionizing radiation irradiated fluorine-containing polymer, the melting point thereof being lower than 325° C. and an amount of crystallization thereof being less than 40 J/g, wherein said fluorine-containing polymer is selected from the group consisting of tetrafluoroethylene polymer, tetrafluoroethylene-perfluoro(alklvinylether) copolymer and tetrafluoroethylene-hexafluoropropylene copolymer, and said fluorine-containing polymer is produced by exposure to ionizing radiation for a total dose of from 1 kGy to 10 MGy in the absence of oxygen at a temperature not lower than the melting point of a starting fluorine-containing polymer.

16. The abrasion resistant product according to claim 15, wherein the resin further comprises a polymer which is not exposed to ionizing radiation.

17. The abrasion resistant product according to claim 15, having a coefficient of abrasion less than half of that of a resin which contains non-radiated fluorine-containing polymer.

* * * * *